June 23, 1936. W. R. WILEY 2,045,320
HOOD CATCH
Filed Aug. 31, 1931 2 Sheets-Sheet 2
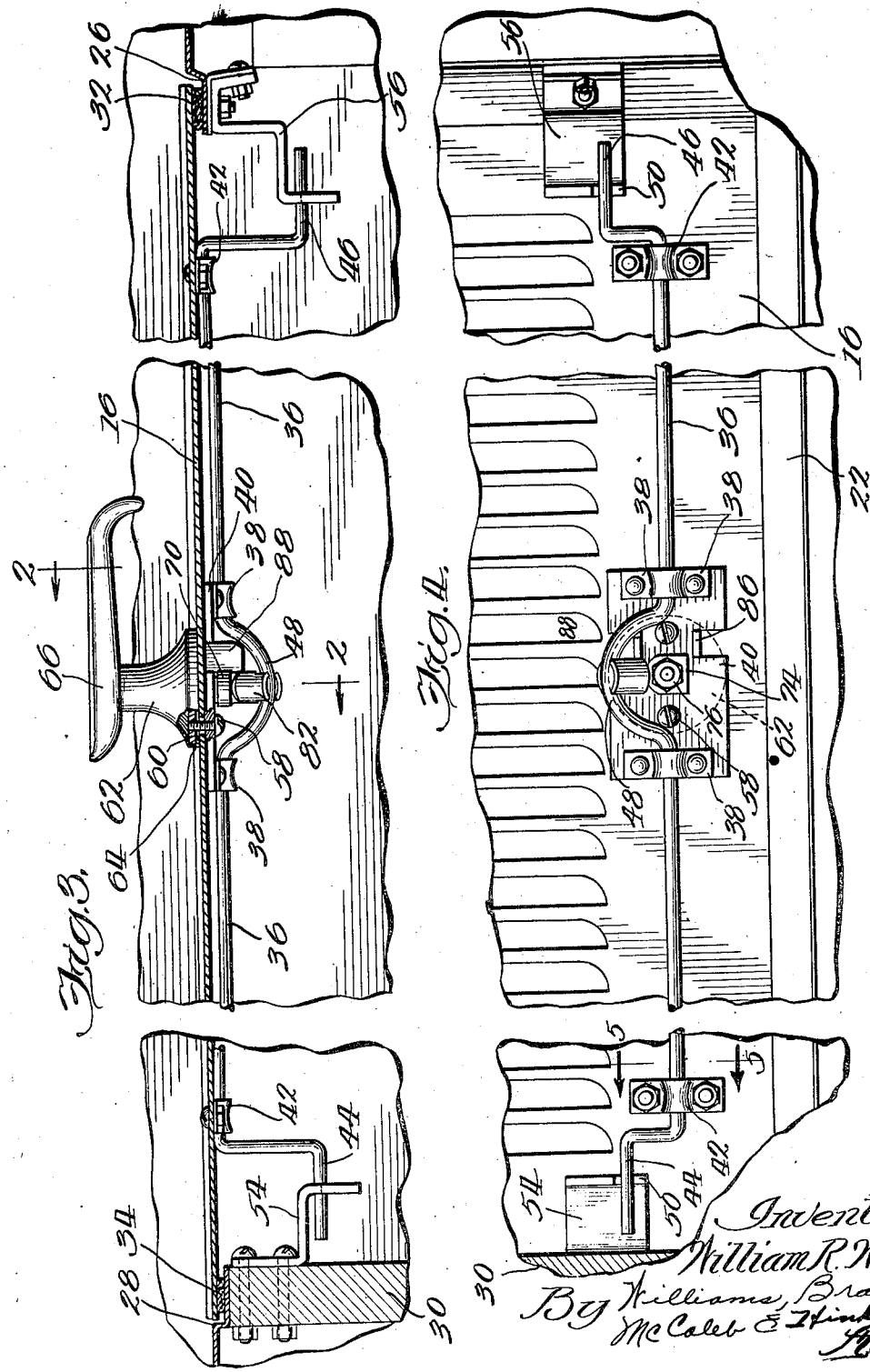

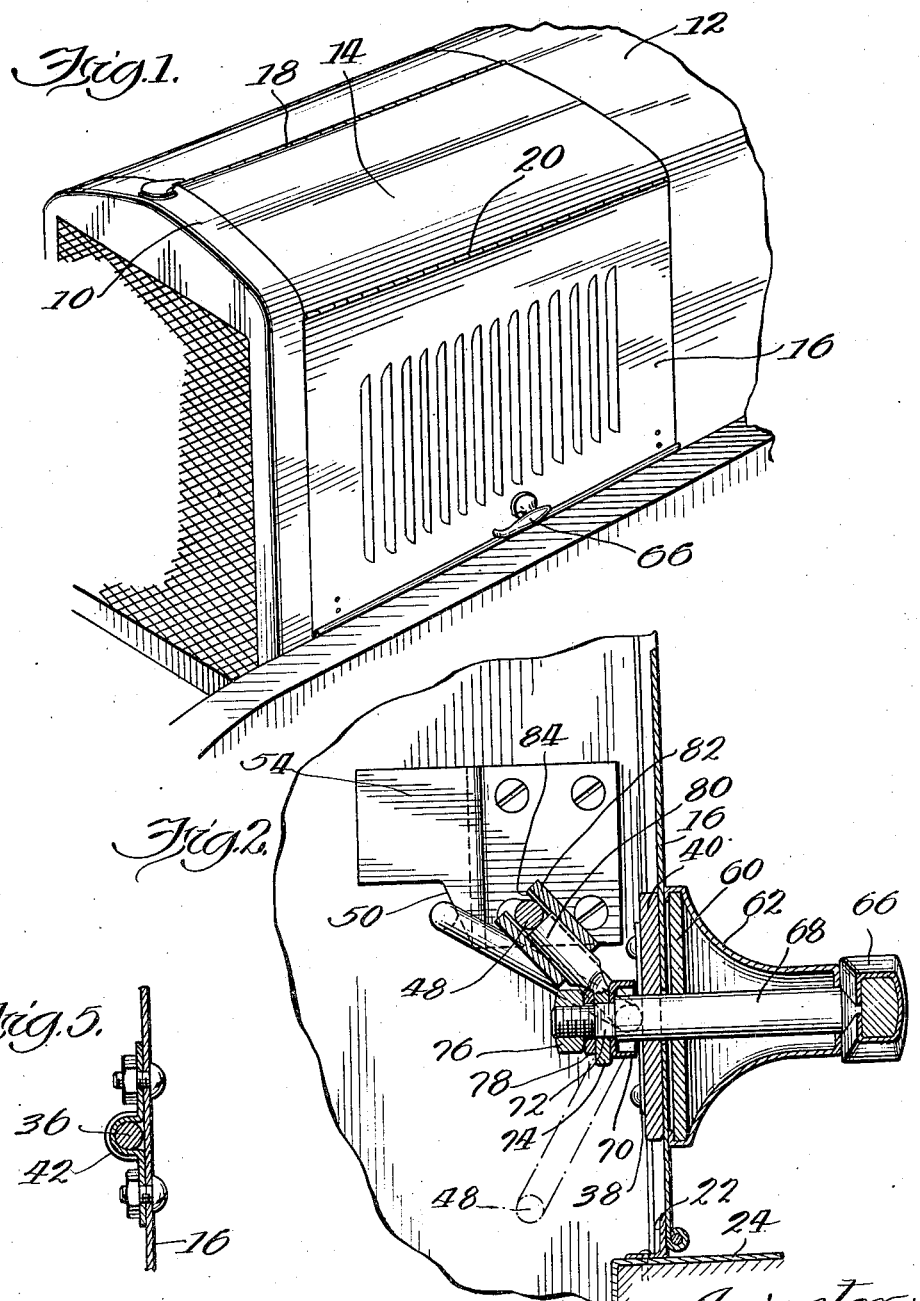

Patented June 23, 1936

2,045,320

UNITED STATES PATENT OFFICE 2,045,320

HOOD CATCH

William R. Wiley, Detroit, Mich., assignor to The Bassick Company, Bridgeport, Conn., a corporation of Connecticut Application August 31, 1931, Serial No. 560,278

4 Claims. (Cl. 292—215)

My invention relates generally to hood catches for motor vehicles and has among its objects the provision of an improved organization of parts by means of which either one of the hingedly connected panels constituting the side and top walls of a radiator hood may be locked in position and unlocked by a single handle-induced action, in such manner that during the locking operation the side wall of the hood will be pulled downwardly and inwardly against the opposed portions of the automobile chassis.

A further object is to provide an improved hood catch having a rock shaft with crank portions mounted upon the inside of the hood, the crank portion being engageable with cam members fixed to the automobile chassis whereby compensation is made for variations and inaccuracies in the dimensions and location of the hood, the rock shaft, and the cam members.

A further object is to provide an improved hood catch which will be operative firmly to lock a double-hinged hood of an automobile in closed position, and which will prevent noise and rattle by the provision of camming means on the automobile chassis engageable by the latch and maintain the latch in resilient engagement with said camming means.

Other objects will appear from the following description, reference being had to the accompanying drawings in which:

Figure 1 is a perspective view of the side of a motor vehicle hood, showing the external hand actuated portion of my improved construction in place;

Fig. 2 is a vertical sectional view taken through the center of the handle shaft on the line 2—2 of Fig. 3;

Fig. 3 is a plan view, partly in section;

Fig. 4 is an elevational view of the inside face of the hood wall showing the hood and latching mechanism in locking position; and Fig. 5 is a detail vertical sectional view taken on the line 5—5 of Fig. 4.

My present invention is an improvement upon the hood latching means disclosed in my prior Patents, No. 1,647,422 granted November 1, 1927, and No. 1,781,261 granted November 11, 1930. The latching means of my present invention differ from that shown in the latter patent mainly in the form of the anchor brackets which are fixed to the chassis of the vehicle and with which the crank arms of the rock shaft are engageable.

I have shown my invention applied to an automobile having the usual radiator shell 10, cowl 12, and radiator hood comprising a top wall 14 and a side wall 16. The top wall is hinged in the usual manner at 18 at the center line of the vehicle and the side wall 16 is joined to the top wall 14 by the usual hinge 20. Inward swinging movement of the hood is limited in any suitable manner by an angle strip 22 which is riveted or otherwise suitably secured to the sill 24 of the vehicle. The forward end of the hood abuts against a flange 28 formed as part of the cowl 12 adjacent the dash board 30. Suitable fabric buffers 32 and 34 are preferably rove through the flanges 26 and 28 respectively to form a gasket-like cushion against which the hood may abut.

The latch of my invention comprises a rock shaft 36 which is mounted for rotation through an angle of approximately 120°. The rock shaft is journaled on the hood by a pair of journalling brackets 38 which are riveted to a base plate 40 and a pair of journal brackets 42 which are bolted or otherwise suitably secured to the side wall 16 of the hood adjacent the ends of the rock shaft 36. The rock shaft has a pair of crank arms 44, 46 formed at its extremities and a deformed central portion 48 which is illustrated as semi-circular in shape.

The longitudinally extending portions of the crank arms 44, 46 are engageable with sloping cam surfaces 50, which are formed upon keeper or anchorage brackets 54, 56 respectively. The bracket 54 is bolted or otherwise suitably secured to the dash board 30 while the bracket 56 is bolted to the radiator shell. If desired these brackets may be secured to the sill or other fixed part of the vehicle chassis although there are advantages in assembly when the brackets are mounted as shown.

The base plate 40 is secured to the side wall 16 of the hood by means of screws 58 which pass through openings in the base plate 40 and suitable perforations in the hood side wall 16, and are threaded in a disc 60 which is secured within the flared handle spacing shell 62, being retained therein by an inwardly bent flange 64 on the shell 62.

The handle 66 is rigidly secured to a handle shaft 68 which extends through and is rotatable in the flared handle mounting shell 62, the disc 60, the hood side wall 16, and the base plate 40. Outward movement of the handle shaft 68 is limited by a flanged washer 70 which fits over the squared portion 72 of the shaft 68 and is held against the cylindrical portion of said shaft by a crank arm 74. The crank arm 74 likewise fits over the squared portions 72 of the shaft so as to rotate with the shaft and is held upon the shaft by a nut 76 threaded on the extremity of the handle shaft and a lock washer 78. The crank arm 74 has a cylindrical pin portion 80 which extends inwardly at an angle to the axis of the shaft 68. A connector sleeve 82 having a diametral slot 84 formed in its outer end is freely rotatable and slidable upon the pin portion 80 of the crank arm 74. The slot 84 in the connector sleeve 82 engages the semi-circular portion 48 of the rock shaft 36 and forms an operative driving connection between the crank pin portion 80 and the rock shaft 36. Rotation of the handle shaft 68 is limited to approximately 180° by a pair of stop lugs 86, 88 which are struck inwardly from the base plate 40.

In unlatching the hood the handle 66 is first rotated clockwise (Fig. 1) through an angle of approximately 180° and the hood then raised by means of the handle. The clockwise swinging movement of the handle shaft 68, through the crank arm 74, its pin portion 80 and connector sleeve 82, swings the rock shaft counterclockwise (Fig. 2) from the position in which it is shown in full lines to the dotted line position thus moving the crank arms 44, 46 of the rock shaft clear from the brackets 54, 56 and unlatching the hood so that it may be raised or swung to open position.

In locking the hood it is first moved by means of the handle 68 to substantially the position shown in Figs. 1 and 2 and then the handle 66 rotated counterclockwise to the position in which it is shown in Figs. 1 and 2. This counterclockwise rotation of the handle causes the rock shaft 36 to swing through an angle of approximately 120° from the dotted line position of Fig. 2 to the full line position. It will be noted that the arms 44, 46 of the rock shaft engage the camming surfaces 50 at points intermediate the ends of these surfaces under normal conditions. As the handle approaches the limit of its counterclockwise movement it applies a torsional strain to the rock shaft thus causing the crank arms 44, 46 firmly to contact with the cam surfaces 50 of the brackets 54, 56. As additional torsional strain is applied to the rock shaft the cam arms 44, 46 will tend to slide slightly upwardly upon the camming surfaces 50 of the brackets. The cam surfaces are of sufficient length so that camming engagement of the crank arms 44, 46 with these cam surfaces is assured even though there be considerable variation in the relative positions of the rock shaft and the brackets due to inaccurate or faulty assembly of the hood latching mechanism or of the brackets 54, 56. The cam surfaces also provide means for assuring proper locking of the hood even though portions of the hood or the rock shaft may be slightly deformed due to accident.

When the latching mechanism is in locked position as shown the rock shaft is under torsional strain and its central portion 48 tends to swing inwardly and downwardly about the axis of the rock shaft. The force due to this tendency causes the handle shaft 68, the connector sleeve 82 and their associated parts to be frictionally held in their locked positions and precludes the possibility of any noise or rattle even though there may be substantial clearance between the parts which are relatively movable. Similarly the rock shaft being torsionally stressed is resiliently held in tight engagement not only with the brackets 54, 56 but also with the journal brackets 38 and 42.

It will thus be seen that I have provided an improved latching mechanism which is simple in construction, which may be readily assembled and installed upon an automobile hood, and which may be easily operated.

What I claim is:

1. A latching device for an automobile hood, adapted to draw the lower edge of a double hinged hood closure downwardly and inwardly in rattle preventing engagement with the opposed portions of the automobile, which includes a rock shaft mounted on the inner face of the closure for rotation about a generally horizontal axis, cranks associated with said rock shaft, abutment members positioned within said closure for engagement with said cranks, and means for rotating said cranks into camming locking engagement with the abutment members, said cranks being adapted, in camming cooperation with said abutment members, automatically to compensate for variations in shape and position of parts affecting the contact between cranks and abutment members, and being adapted, in response to their engagement with the abutment members, to draw the lower edge of the hood closure downwardly and inwardly against the opposed portions of the automobile, said cranks engaging said abutment members at all times, in all normal adjustments, in a slidable relationship.

2. A latching device for an automobile hood, adapted to draw the lower edge of a double hinged closure downwardly and inwardly in rattle preventing engagement with the opposed portions of the automobile, which includes a yieldingly torsionally distortable rock shaft mounted on the inner face of the closure for rotation about a generally horizontal axis, cranks associated with said rock shaft, abutment members positioned within said closure for engagement with said cranks, and means for rotating said shaft and cranks into camming locking engagement with the abutment members, said cranks and shaft being adapted, in cooperation with said abutment members, automatically to compensate for variations in shape and position of parts affecting the contact between cranks and abutment members, and being adapted, in response to their engagement with the abutment members, to draw the lower edge of the hood closure downwardly and inwardly against the opposed portions of the automobile, said cranks being adapted slidably to engage said abutment members at all times, in all normal adjustments.

3. In a latching device for an automobile hood, adapted to draw the lower edge of a double hinged hood closure downwardly and inwardly against opposed portions of the automobile, a rock shaft mounted on the inner face of the closure for rotation about a generally horizontal axis, a base plate on which said shaft is rotatably mounted, cranks associated with said rock shaft, cam members, positioned within said closure, adapted for variable contact engagement with said cranks, said cranks being adapted, in response to rotation of the shaft and their engagement with the cam members, to draw the lower edge of the hood closure downwardly and inwardly against the opposed portions of the automobile, and means for rotating the rock shaft, including a handle shaft mounted upon said base plate for rotation about an axis generally at right angles to the axis of rotation of the rock shaft, an exterior handle, and an actuating connection between said handle shaft and the rock shaft, and limit means, associated with said base plate, for positively limiting the arc of rotation of the handle shaft.

4. A latching device for the hinged section of an automobile hood which includes a rock shaft rotatably mounted on the inner face of the hood, and means for rotating said rock shaft, said means including a handle exterior to said hood, a crank arm positioned within said hood, said handle and crank arm being rotatable about an axis generally perpendicular to the face of the hood, a crank pin on said arm, the rock shaft having an offset portion in engagement with said crank arm and a connector upon said crank pin adapted to maintain said crank pin and the offset portion of said rock shaft in operative relationship.

WILLIAM R. WILEY.